US007945536B2

(12) United States Patent
Bao et al.

(10) Patent No.: US 7,945,536 B2
(45) Date of Patent: May 17, 2011

(54) METHOD AND SYSTEM FOR RECOVERING A PREVIOUS VERSION OF A DOCUMENT FROM A CURRENT VERSION OF THE DOCUMENT

(75) Inventors: Hongqing Bao, Shenzhen (CN); Qian Sun, Shenzhen (CN); Yang Zhao, Shenzhen (CN); Xuefei Song, Shenzhen (CN); Linyi Tian, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 377 days.

(21) Appl. No.: 12/003,311

(22) Filed: Dec. 21, 2007

(65) Prior Publication Data
US 2008/0147751 A1 Jun. 19, 2008

Related U.S. Application Data

(63) Continuation of application No. PCT/CN2006/002529, filed on Sep. 26, 2006.

(30) Foreign Application Priority Data

Dec. 7, 2005 (CN) .......................... 2005 1 0102270

(51) Int. Cl.
*G06F 7/00* (2006.01)
*G06F 17/00* (2006.01)
(52) U.S. Cl. ...................... 707/674; 707/678; 707/684
(58) Field of Classification Search .......... 707/650–654, 707/674–686, 695, 661
See application file for complete search history.

(56) References Cited

U.S. PATENT DOCUMENTS
6,292,808 B1 9/2001 Obermarck et al.
(Continued)

FOREIGN PATENT DOCUMENTS
CN 1588352 A 3/2005
(Continued)

OTHER PUBLICATIONS

J. Rosenberg, "An XML Format for Representing XML Configuration Access Protocol (XCAP) Change Logs", Internet Society, 2005, pp. 1-12. Download: http://www.ietf.org/proceedings/65/IDs/draft-rosenberg-simple-xcap-change-log-00.txt.*

(Continued)

*Primary Examiner* — Jean M Corrielus
*Assistant Examiner* — Hares Jami
(74) *Attorney, Agent, or Firm* — Finnegan, Henderson, Farabow, Garrett & Dunner LLP

(57) ABSTRACT

An extensible markup language document management method includes: receiving a document recovery request from a user; and recovering a version of the document as required by a user from the current version of the document, in accordance with the change records for the document. An extensible markup language document management system includes: a rollback control module, adapted to recover a version of a document as required by a user from the current version of the document, in accordance with change records for the document, upon receiving a document recovery request from the user.

7 Claims, 9 Drawing Sheets

U.S. PATENT DOCUMENTS

| | | | |
|---|---|---|---|
| 7,305,422 B1 * | 12/2007 | Wang | 707/999.203 |
| 2002/0007363 A1 * | 1/2002 | Vaitzblit | 707/202 |
| 2004/0088331 A1 * | 5/2004 | Therrien et al. | 707/200 |
| 2005/0014494 A1 | 1/2005 | Owen et al. | |
| 2005/0108298 A1 * | 5/2005 | Iyengar et al. | 707/201 |
| 2005/0203953 A1 | 9/2005 | McGee et al. | |
| 2006/0053208 A1 * | 3/2006 | Laurila et al. | 709/206 |
| 2007/0061382 A1 * | 3/2007 | Davis et al. | 707/999.201 |

FOREIGN PATENT DOCUMENTS

| | | |
|---|---|---|
| CN | 1618066 A | 5/2005 |
| WO | WO 2005/086032 A1 | 9/2005 |
| WO | WO 2007/065332 A1 | 6/2007 |

OTHER PUBLICATIONS

Written Opinion of the International Searching Authority (translation) dated (mailed) Jan. 25, 2007, issued in related Application No. PCT/CN2006/002529, filed Sep. 26, 2006, Huawei Technologies Co., Ltd.

First Chinese Office Action dated (mailed) Nov. 21, 2008, issued in related Chinese Application No. 200510102270.4, Huawei Technologies Co., Ltd.

Second Chinese Office Action dated (mailed) Jul. 3, 2009, issued in Chinese Application No. 200510102270.4, Huawei Technologies Co., Ltd.

Third Chinese Office Action dated (mailed) Jun. 23, 2010, issued in Chinese Application No. 200510102270.4, Huawei Technologies Co., Ltd.

Open Mobile Alliance, XML Document Management (XDM) Specification, Candidate Version 1.0-22, Nov. 22, 2005. OMA-TS-XDM_Core-V1_0-20051122-C, 2005, (52 pages).

J. Rosenberg, The Extension Markup Language (XML) Configuration Access Protocol (XCAP) draft-ietf-simple-xcap-08, Oct. 24, 2005 (1-59 pages).

* cited by examiner

METHOD AND SYSTEM FOR RECOVERING A PREVIOUS VERSION OF A DOCUMENT FROM A CURRENT VERSION OF THE DOCUMENT

CROSS-REFERENCE TO RELATED APPLICATIONS

The present application is a continuation application of PCT application No. PCT/CN2006/002529, filed Sep. 26, 2006, which claims Chinese priority No. 200510102270.4, filed Dec. 7, 2005.

FIELD OF THE INVENTION

The present invention relates to the field of data communications, and in particular to an XML document management method and system.

BACKGROUND OF THE INVENTION

An Extensible Markup Language (XML) Document Management (XDM) system is a universal enabler for various services in Open Mobile Alliance (OMA) standards. The XDM system is capable of storing and managing the data of various enablers.

As illustrated in FIG. 1, an XDM system primarily includes an XDM client 100, an aggregation proxy server 200, and XDM servers 300. The XDM client 100 is an entity with an access to different XDM servers, and may be a user equipment terminal or a server. When the XDM client 100 is a user equipment terminal, an XML Configuration Access Protocol (XCAP) request transmitted by the XDM client 100 is forwarded by the aggregation proxy server 200 to a corresponding XDM server 300. When being a server, the XDM client interacts directly with the XDM servers 300. The XDM client 100 manages XML documents stored in the XDM servers 300 via XCAP protocol.

The aggregation proxy server 200 is primarily adapted to provide the functions of, e.g. routing, authentication or charging and compression.

The XDM servers 300 store and manage XML documents for multiple XDM clients, and provide a notification message for an XDM client, which subscribes to a notification on a change of some documents, upon any change of the corresponding documents. The XDM servers 300 also provide an authentication function.

In the existing XDM system, the management and operations of the XDM client 100 on an XML document include:

(1) A creation or update operation: The XDM client 100 may transmit to an XDM server 300 an XCAP PUT request for creating or updating a document or an element or attribute in a document.

(2) A reading operation: The XDM client 100 may transmit to an XDM server 300 an XCAP GET request for retrieving a document or an element or attribute in a document.

(3) A deletion operation: The XDM client 100 may transmit to an XDM server 300 an XCAP DELETE request for deleting a document or an element or attribute in a document.

In addition to the above document management and operations, the XDM system is required in many cases to support a document recovery function of recovering the state of an XML document at a previous point of time from the state of the XML document at a point of time. For example, a user changes an XML document on an XDM server 300 through the XDM client 100, thereafter finds the misoperation, and wishes to recover the original state of the document prior to the change. Such a function can not be supported by the existing XDM system, which therefore limits the application for the user.

SUMMARY OF THE INVENTION

An object of the invention is to address such an issue that an XDM system existed in the prior art can not support the recovery of the state of an XML document at a previous point of time from the state of the XML document at a point of time, which limits the application for users.

The object of the invention is attained through the following technical solutions.

An extensible markup language document management method includes the steps of:

storing change records for a document;

recovering a current document of the document which a user requests for recovering, to a version as needed by the user, dependent upon the change records corresponding to the document which the user requests for recovering, upon reception of a document recovery request from the user.

Prior to storing the change records for the document, the method further includes:

determining whether to store the change records for the document.

The storing of the change records for the document further includes:

performing a control on a size of the change records for the document.

The recovering operation further includes:

searching for the change records corresponding to the document which the user requests for recovering, locating a corresponding operation object in the current document, and recovering sequentially operations prior to a change in a reverse time sequence until the version as needed by the user is recovered.

The recovering operation further includes:

generating a sequence of reverse operation requests dependent upon the change records corresponding to the document which the user requests for recovering;

changing the current document dependent upon the sequence of reverse operation requests until the version as needed by the user is recovered.

The document recovery request in the recovering operation is transmitted through:

an XCAP request message or an HTTP POST request message.

An extensible markup language document management system includes:

a change-recording storage module adapted to store change records for a document;

a change operation record module adapted to perform a change recording operation for the document and to store a change operation record into the change records for the document;

a rollback control module adapted to recover a current document of the document which a user requests for recovering, to a version as needed by the user, dependent upon the change records corresponding to the document which the user requests for recovering, upon reception of a document recovery request from the user.

The system further includes:

a change configuration module adapted to determine whether to store the change records for the user and to control the change operation record module to store the change operation record into the change records for the document.

The change configuration module is further adapted to limit a size of the change records.

The rollback control module further includes:

a rollback operation sub-module adapted to search for the change records corresponding to the document which the user requests for recovering and to recover sequentially operations prior to a change in a reverse time sequence until the version as needed by the user is recovered.

The rollback control module is arranged in a client or a dedicated rollback server;

the change-recording storage module and the change operation record module are arranged in a server.

The rollback control module, the change-recording storage module and the change operation record module are arranged in a server.

The rollback control module further includes:

a reverse operation request generation sub-module adapted to generate a sequence of reverse operation requests dependent upon the change records corresponding to the document which the user requests for recovering.

The system further includes:

a reverse operation request response module adapted to change the current document dependent upon the sequence of reverse operation requests until the version as needed by the user is recovered.

The rollback control module, the change-recording storage module, the reverse operation request response module and the change operation record module are arranged in a server.

The rollback control module is arranged in a client or a dedicated rollback server;

the change-recording storage module, the change operation record module and the reverse operation request response module are arranged in a server.

It is obvious from the inventive technical solutions that with the invention, a rollback operation can be enabled on the document, so that the user can recover the document to a previous version, and thus a remedy can be provided for a document misoperation of the user.

DETAILED DESCRIPTION OF THE INVENTION

The invention will be further described in detail with reference to the drawings and embodiments of the invention to make the object, technical solutions and advantageous of the invention clearer to be understood. It shall be understood that the specific embodiments described here are merely intended to explain but not to limit the invention.

According to the invention, when a user desires to perform a recovery on a current XML document, a version of the XML document as required by the user may be recovered from the current XML document by using the change record of the current XML document, and a remedy can be provided for a misoperation by the user.

Figure 1:
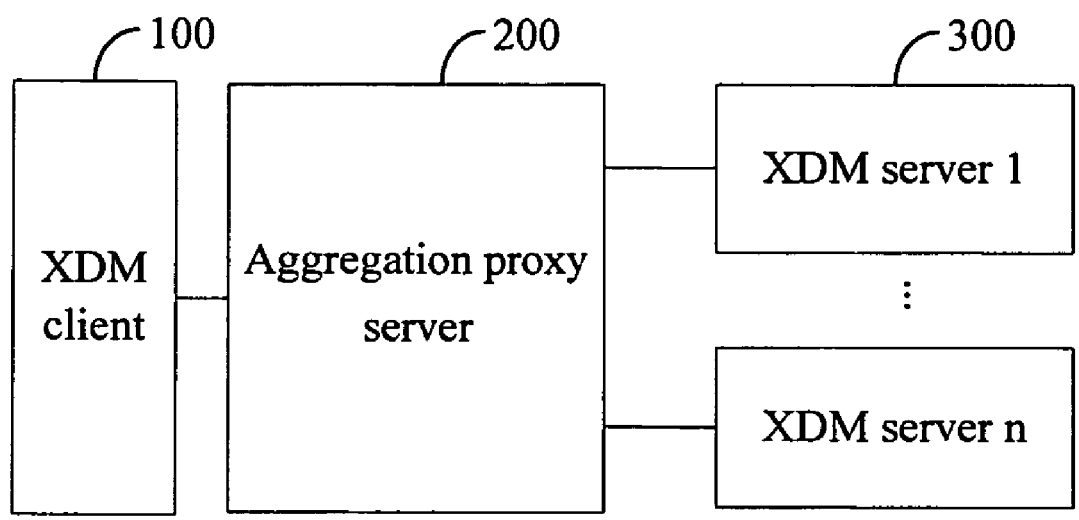
FIG. 1 is a typical structural diagram of an XDM system in the prior art.
Figure 2:
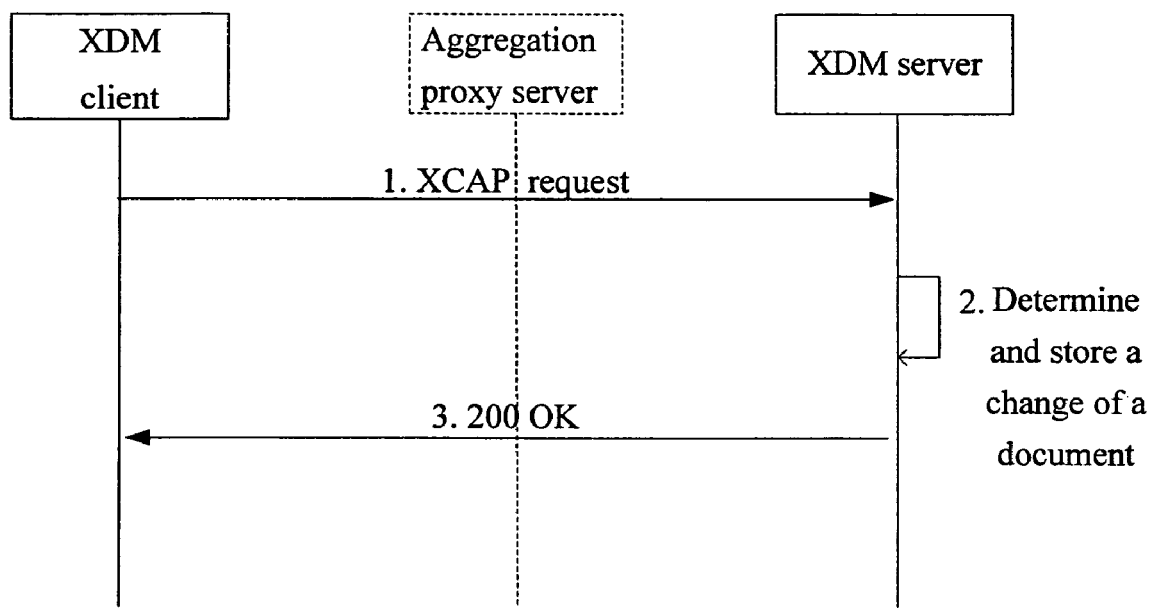
FIG. 2 is a flow diagram of implementing the storage of a change record for an XML document.

FIG. 2 illustrates a flow diagram of implementing the storage of a change record for an XML document:

1: An XDM client 100 transmits to an XDM server 300 an XCAP request for changing an XML document. If the XDM client 100 is a user equipment client, the XCAP request is forwarded through an aggregation proxy server 200.

2: Upon determining that the XCAP request is for a document change operation, such as XCAP PUT or XCAP DELETE, the XDM server 300 determines that a record shall be made for the change operation in accordance with user requirements, and then stores a change record for the XML document.

3: The XDM server 300 returns a response message (200 OK) to the XDM client 100. If the XDM client 100 is a user equipment client, the response message is forwarded through the aggregation proxy server 200.

In the above procedure, the XDM server 300 may control the scale of the change-recording document by clearing the change-recording document so as to limit the scale of the document. For example, the number of operations recorded for each XML document may be defined; and if the recording of a change operation for an XML document goes against a limiting rule, the XDM server 300 may delete original change record(s) stored for a relatively long time period. In another example, a storage time period for each operation record is defined, and operation record(s) exceeding the storage time period may be cleared. Prior to clearing the change record of the XML document, or when the change record of the XML document is exceeding a predetermined scale, the XDM server 300 may transit a notification message as requested by the XDM client 100.

In a first embodiment of the invention, a rollback operation is performed dependent upon an XML document and a change-recording document for the XML document. Firstly, the change-recording document is searched for a change record corresponding to the document version as required, and an operation object in the XML document is located. In the case of an XCAP DELETE operation, a recorded element or attribute value prior to deletion is inserted at the location, and in the case of an XCAP PUT operation, an element or attribute prior to the operation is present in the change record, the element or attribute at the location is replaced with the element or attribute prior to the operation. The rollback is performed sequentially in a reverse time sequence until the rollback arrives at an XML document of the version as required.

The above document rollback operation may be implemented in either the XDM client 100 or the XDM server 300, or by a dedicated rollback server.

Figure 3:
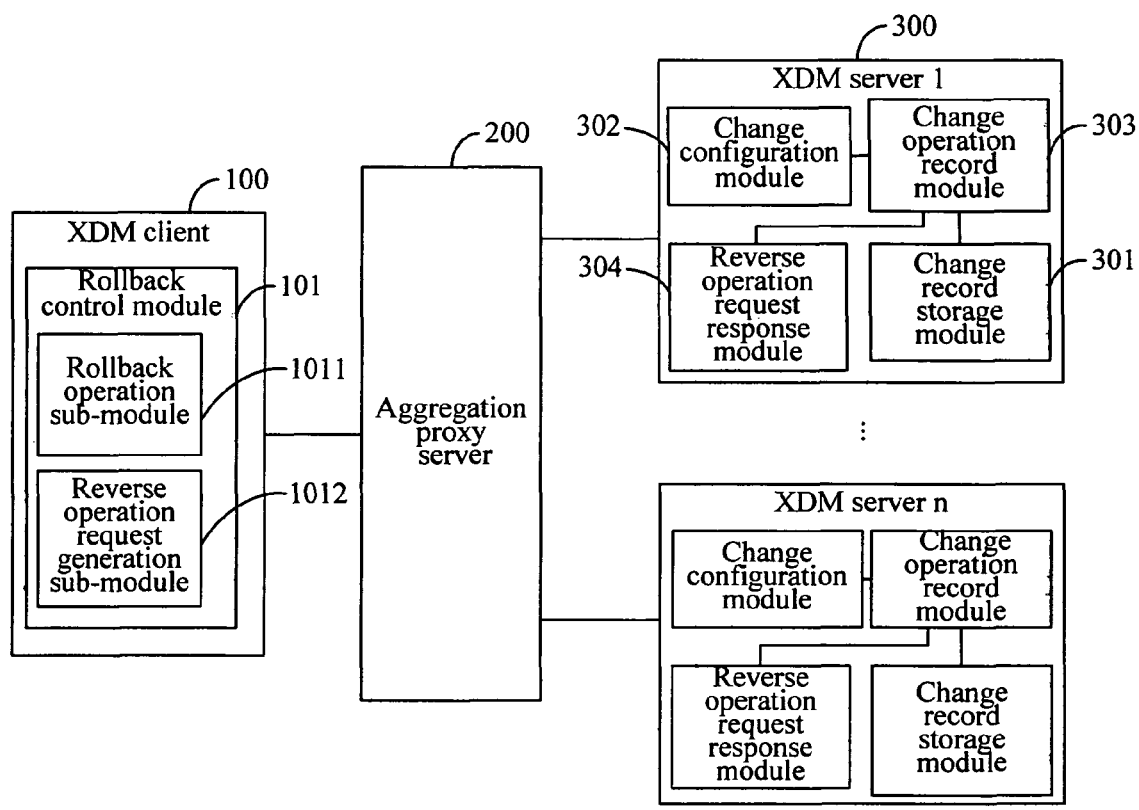
FIG. 3 is a structural diagram of a system for implementing a document rollback operation at an XDM client in a first embodiment of the invention.

FIG. 3 illustrates a structure of a system for implementing a document rollback operation at the XDM client 100.

The XDM client 100 includes a rollback control module 101. The XDM server 300 includes a change-recording storage module 301, a change configuration module 302 and a change operation record module 303.

The rollback control module 101 performs a rollback operation on an XML document, thereby rolling the XML document back to a version at a previous time point. The rollback control module 101 performs the rollback operation through a rollback operation sub-module 1011.

The XDM client further includes a reverse operation request generation module 1012 adapted to generate a reverse operation request.

In correspondence with the reverse operation request generation module 1012 of the XDM client, a reverse operation request response module 304 is arranged in the XDM server. The reverse operation request response module 304 is adapted to perform a rollback change on a document in response to the reverse operation request generated by the reverse operation request generation module 1012.

The change-recording storage module 301 records change records for an XML document. If the change operation record module 303 needs to record the change of an XML document, the change is recorded in the change-recording storage module 301.

The change-recording storage module 301 maintains a change-recording document for each user, which records the change of an XML document. Every time the user performs a creation, deletion or change operation on an XML document, the XDM server 300 records a change in the change-recording document.

The change record in the change-recording document may take the following XML structure:

```
<?xml version="1.0" encoding="UTF-8"?>
<xs:schema targetNamespace="urn:ietf:params:xml:ns:xcap-log"
    xmlns:xs="http://www.w3.org/2001/XMLSchema"
    xmlns="urn:ietf:params:xml:ns:xcap-log"
    elementFormDefault="qualified"
    attributeFormDefault="unqualified">
    <xs:element name="change-log">
        <xs:complexType>
            <xs:sequence minOccurs="0" maxOccurs="unbounded">
                <xs:choice>
                    <xs:element ref="delete-event"/>
                    <xs:element ref="put-event"/>
                    <xs:any namespace="##other" minOccurs="0" maxOccurs="unbounded"/>
                </xs:choice>
            </xs:sequence>
        </xs:complexType>
    </xs:element>
    <xs:element name="put-event">
        <xs:complexType>
            <xs:choice>
                <xs:complexType>
                    <xs:element name="previous-element">
                        <xs:complexType>
                            <xs:sequence>
                                <xs:any namespace="##other"/>
                            </xs:sequence>
                        </xs:complexType>
                    </xs:element>
                    <xs:element name="element">
                        <xs:complexType>
                            <xs:sequence>
                                <xs:any namespace="##other"/>
                            </xs:sequence>
                        </xs:complexType>
                    </xs:element>
                </xs:complexType>
                <xs:complexType>
                    <xs:element name="attribute" type="xs:string"/>
                    <xs:element name="previous-attribute" type="xs:string"/>
                </xs:complexType>
                <xs:any namespace="##other"/>
            </xs:choice>
            <xs:element name="type" type="operationType"/>
            <xs:element name="operator" type="XUIType"/>
            <xs:element name="previous-etag" type="etagType"/>
            <xs:element name="etag" type="etagType"/>
            <xs:element name="timestamp" type="timestampType"/>
            <xs:attribute name="node-selector" type="xs:anyURI" use="optional"/>
        </xs:complexType>
    </xs:element>
    <xs:element name="delete-event">
        <xs:complexType>
            <xs:choice>
                <xs:element name="previous-element">
                    <xs:complexType>
                        <xs:sequence>
                            <xs:any namespace="##other"/>
                        </xs:sequence>
                    </xs:complexType>
                </xs:element>
                <xs:element name="previous-attribute" type="xs:string"/>
            </xs:choice>
            <xs:element name="type" type="operationType"/>
            <xs:element name="operator" type="XUIType"/>
            <xs:element name="previous-etag" type="etagType"/>
            <xs:element name="etag" type="etagType"/>
            <xs:element name="timestamp" type="timestampType"/>
            <xs:attribute name="node-selector" type="xs:anyURI" use="optional"/>
            <xs:attribute name="node-selector" type="xs:anyURI" use="optional"/>
        </xs:complexType>
    </xs:element>
</xs:schema>
```

In the above structure, the change record for an XML document is represented by an element <change-log>. <change-log> includes several elements <put-event> or <delete-event> indicative of a record of changing the XML document. The element is <put-event> if the changing is XCAP PUT. The element is <delete-event> if the changing is XCAP DELETE.

In the <put-event>, if an operation object is an element in the XML document, <previous-element> records information on the element prior to the operation, and <element> records information on the element after the operation; and if an operation object is an attribute of an element in the XML document, <previous-element> records information on the attribute prior to the operation, and <attribute> records information on the attribute after the operation.

In the <delete-event>, if an operation object is an element in the XML document, <previous-element> records information on the element prior to the deletion operation; and if an operation object is an attribute of an element in the XML document, <previous-element> records information on the attribute prior to the deletion operation.

Either of the <put-event> and <delete-event> includes an attribute "node-selector" specifying an element corresponding to a change operation. Either of the <put-event> and the <delete-event> further includes sub-elements of <type>, <operator>, <previous-etag>, <etag>, <timestamp>, etc. Particularly, the <type> indicates an operation type, such as creation, change and deletion. The <operator> indicates an operator. The <previous-etag> indicates the etag value of the document prior to the operation, <etag> indicates the etag value of the document after the operation, <timestamp> indicates the time stamp at the time of the operation.

The change record for an XML document may take the following XML structure:

```
<?xml version="1.0" encoding="UTF-8"?>
<xs:schema targetNamespace="urn:ietf:params:xml:ns:xcap-log"
    xmlns:xs="http://www.w3.org/2001/XMLSchema"
    xmlns="urn:ietf:params:xml:ns:xcap-log"
    elementFormDefault="qualified"
    attributeFormDefault="unqualified">
  <xs:element name="xcap-log">
    <xs:complexType>
      <xs:sequence minOccurs="0" maxOccurs="unbounded">
        <xs:element name="document">
          <xs:element ref="change-log"/>
          <xs:attribute name="doc-selector" type="xs:anyURI"/>
            <xs:attribute name="previous-etag" type="etagType"/>
            <xs:attribute name="etag" type="etagType"/>
        </xs:element>
      </xs:sequence>
    </xs:complexType>
  </xs:element>
</xs:schema>
```

Practically, not documents of all users or change operations on all documents of a user should be recorded. The change configuration module 302 is adapted to control whether to record a change operation on an XML document and limit scale of the change record. For example, at most ten change operations may be recorded or change operations for only one latest month can be stored for a document of a user. When the XDM server 300 creates, deletes or changes an XML document, the change configuration module 302 determines whether to record the change operation on the XML document; and if a recording is required, the change operation record module 303 records the change operation in the change-recording storage module 301. During a rollback operation, the rollback control module 101 should refer to the change configuration module 302 to determine whether a change operation for the corresponding XML document is present.

The change configuration module 302 stores information on a change operation in a format of an XML document with the following structure:

```
<?xml version="1.0" encoding="UTF-8"?>
<xs:schema targetNamespace="urn:oma:params:xml:ns:xcap-log-configure"
    xmlns:xs="http://www.w3.org/2001/XMLSchema"
    xmlns="urn:ietf:params:xml:ns:xcap-log"
    elementFormDefault="qualified" attributeFormDefault="unqualified">
  <xs:element name="log-configure">
    <xs:complexType>
      <xs:sequence minOccurs="0" maxOccurs="unbounded">
        <xs:element name="document">
          <xs:complexType>
            <xs:element name="need-log" type="xs:boolean"/>
            <xs:complexType>
              <xs:choice>
                <xs:element name="log-scale" type="xs:integer"/>
                <xs:element name="log-period" type="xs:timespan"/>
              </xs:choice>
            </xs:complexType>
          </xs:complexType>
          <xs:attribute name="doc-selector" type="xs:anyURI"/>
        </xs:element>
      </xs:sequence>
    </xs:complexType>
  </xs:element>
</xs:schema>
```

Figure 4:
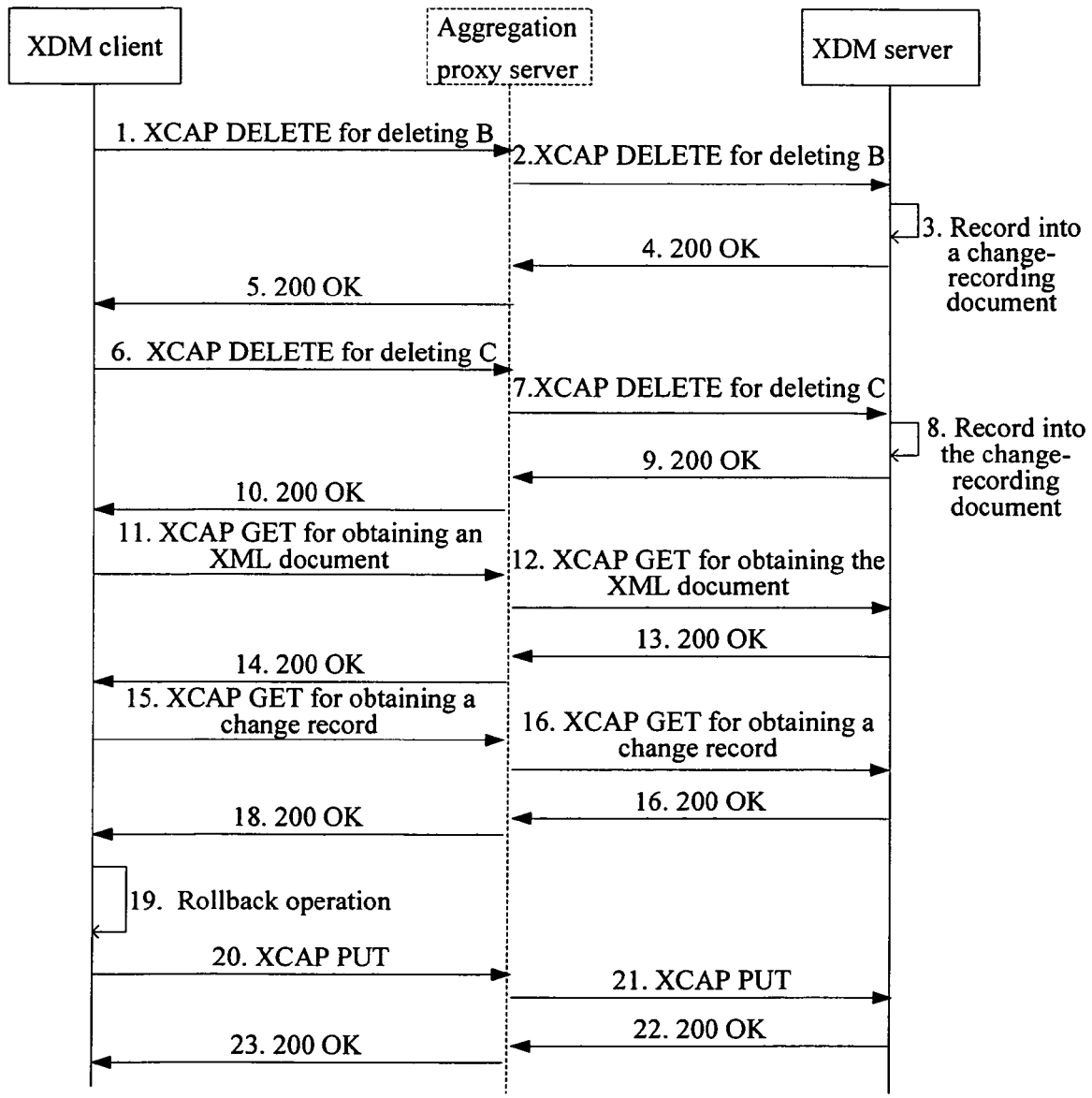
FIG. 4 is a flow diagram of implementing a document rollback operation at an XDM client in the first embodiment of the invention.

FIG. 4 illustrates a flow chart for implementing a document rollback operation at the XDM client 100, in which a user requests the XDM server 300 for deleting users B and C from a friend list via an XCAP protocol, thereafter finds the deletion operation is performed in error, and desires to roll the state of the XML document back to the state prior to the deletion and store the document in the XDM server 300.

The XML document prior to the change is as follows:

```
<?xml version="1.0" encoding="UTF-8"?>
<resource-lists xmlns="urn:ietf:params:xml:ns:resource-lists">
  <list name="friends">
    <entry uri="sip:userB@example.com">
      <display-name>Bob</display-name>
    </entry>
    <entry uri="sip:userC@example.com">
      <display-name>Christopher</display-name>
    </entry>
    <entry uri="sip:userD@example.com">
      <display-name>Dennis</display-name>
    </entry>
  </list>
</resource-lists>
```

The corresponding change-recording document is as follows:

```
<?xml version="1.0" encoding="UTF-8"?>
<log-configure xmlns="urn:oma:params:xml:ns:log-configure">
  <log-configure>
    <document doc-selector="resource-lists/users/userA/friends.xml">
      <need-log>true</need-log>
      <log-scale>100</log-scale>
    </document>
  </log-configure>
```

As can be seen from the above, an element <change> in a relevant <document> node in the initial change-recording document is null.

A specific implementation flow is as follows:

(1) The XDM client 100 requests the XDM server 300 via the XCAP protocol for deleting friends B and C from its friend list friends.xml, respectively. The XDM server 300 deletes the friends B and C. The change operation record module 303 records change information in the above format to the change-recording document in the change-recording storage module 301 dependent upon that the change configuration module 302 determines that a record is required for the deletion operation of this document (friends.xml) by the user (processes of 1 to 10 in FIG. 4).

(2) If the user needs to perform a rollback for the deletion operation, and the XDM client 100 transmits to the XDM server 300 through the aggregation proxy server 200 an XCAP GET request for a latest XML document (friends.xml) stored in the XDM server 300 (processes of 11 and 12 in FIG. 4).

(3) The XDM server 300 returns the XML document requested to the XDM client 100 of the user through the aggregation proxy server 200 (processes of 13 and 14 in FIG. 4).

(4) The user requests the XDM server 300 via XCAP GET for change record for the XML document (processes of 15 and 16 in FIG. 4).

(5) The XDM server 300 returns a change record for the XML document requested by the user to the XDM client 100 through the aggregation proxy server 200, after the change configuration module 302 determines that the change record for the XML document is present (processes of 17 and 18 in FIG. 4).

(6) The XDM client 100 performs a rollback operation on the XML document, thereby rolling the XML document back to the state prior to deletion of B and C (process of 19 in FIG. 4).

The rollback operation sub-module 1011 retrieves from contents of the element <timestamp> in the element <delete-event> the lastly changed element <delete-event>, i.e. the second element <delete-event> in the change record, determines that the operation type is element deletion in accordance with the sub-element <type> of the element <delete-event>, determines the location of the deleted element in the original document in accordance with the attribute "node-selector" of the element <delete-event>, and inserts an element prior to the deletion (i.e. an element recorded in the sub-element <previous-element>) in the determined location in the original document, thereby finishing a rollback process. The rollback process is performed sequentially on each element <operation> recording an operation at a recent time. When the user determines a rollback arrival at the state as required, the rollback-to XML document may be stored in the XDM server 300 via an XCAP PUT request.

(7) The XDM client 100 of the user transmits the rollback-to XML document to the XDM server 300 for storage via the aggregation proxy server 200 through an XCAP PUT request (processes of 20 to 23 in FIG. 4).

In the above flow, the XCAP request, which is transmitted from the user to the XDM server 300 when the user deletes its friend B from the list in step 1 as illustrated in FIG. 4, is in the following format:

DELETE http://xcap.example.com/services/resource-lists/users/sip:userA@example.com/friends.xml~~/resource-lists/list[@name="friends"]/entry[@uri="sip:userB@example.com"] HTTP/1.1
Content-length: 0

After the XDM server 300 records the operation of deleting B and C dependent upon the change configuration module 302 in steps 3 and 8, contents of the node in the change record document are as follows:

```
<document  doc-selector=" resource-lists/users/userA/friends.xml"
      previous-etag="abababab"
      etag="efefefef">
  <delete-event  node-selector=" resouce-lists/list[@name=%22friends
      %22]/entry[@uri=%22userB@example.com%22]" >
    <type>del-elem</type>
    <requestor> sip:userA@example.com </requestor>
    <previous-etag>abababab</ previous-etag >
    <etag> cdcdcdcd</etag>
    <timestamp>199809010915001</timestamp>
    <previous-element>
      <entry uri="sip:userB@example.com">
        <display-name>Bob </display-name>
      </entry>
    </previous-element>
  </ delete-event >
  < delete-event node-selector=" resouce-lists/list[@name=%22friends
      %22]/entry[@uri=%22userC@example.com%22]">
    <type>del-elem</type>
    <requestor> sip:userA@example.com </requestor>
    <previous-etag>cdcdcdcd</ previous-etag >
    <etag> efefefef</etag>
    <timestamp>199809010915002</timestamp>
    <previous-element>
      <entry uri="sip:userC@example.com">
        <display-name>Christopher</display-name>
      </entry>
    </previous-element>
    <new-element />
  </operation>
</document>
```

Contents of the changed XML document stored in the XDM server 300 are as follows:

```
<?xml version="1.0" encoding="UTF-8"?>
<resource-lists xmlns="urn:ietf:params:xml:ns:resource-lists">
  <list name="friends">
    <entry uri="sip:userD@example.com">
      <display-name>Dennis</display-name>
    </entry>
  </list>
</resource-lists>
```

Figure 5:
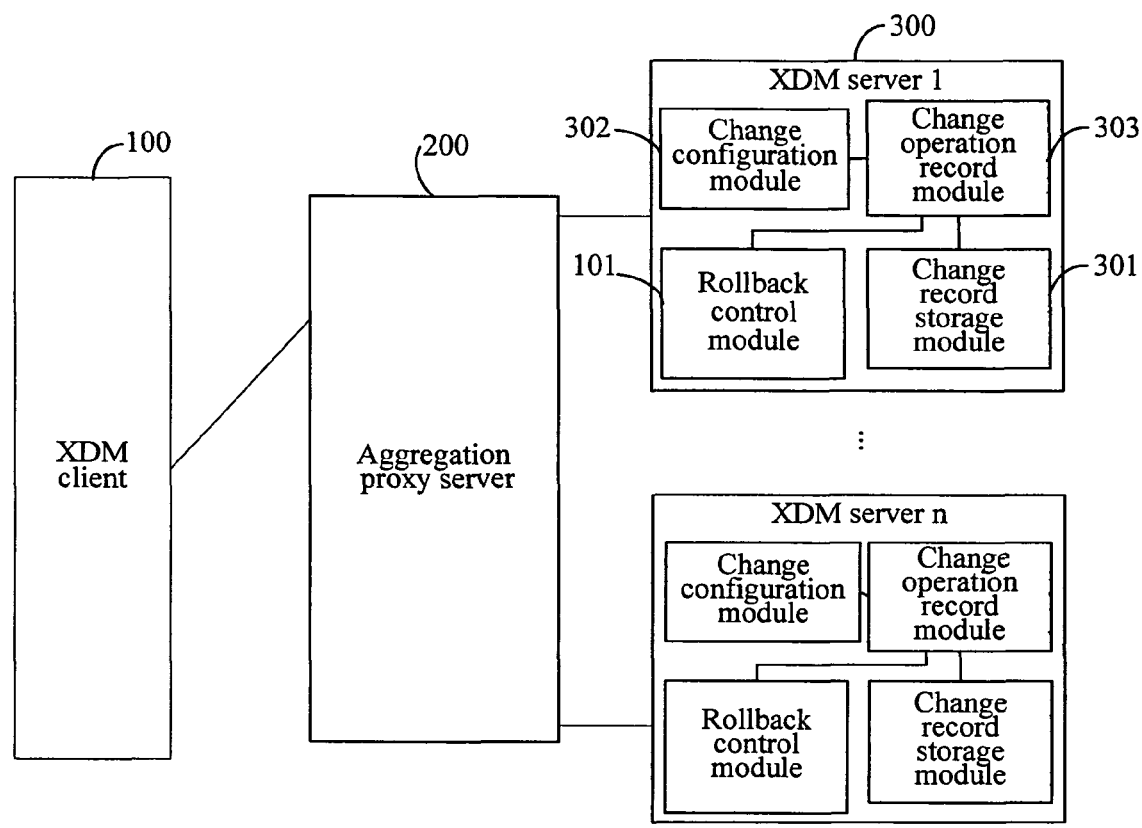
FIG. 5 is a structural diagram of a system for implementing a document rollback operation at an XDM server in the first embodiment of the invention.
Figure 6:
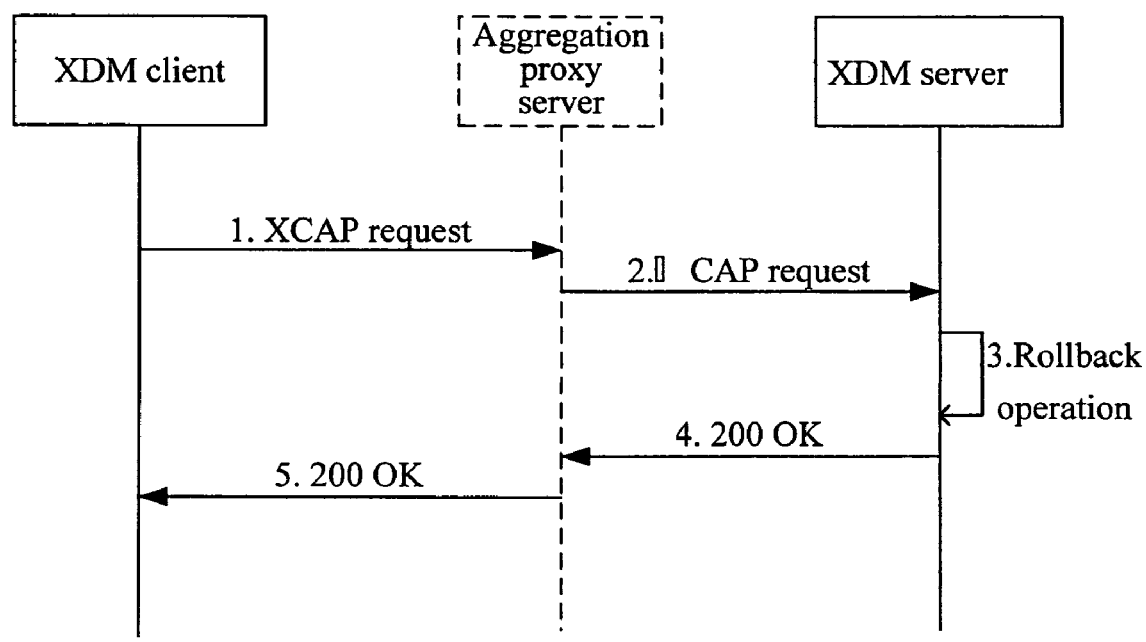
FIG. 6 is a flow diagram of implementing a document rollback operation at an XDM server in the first embodiment of the invention.

FIG. 5 illustrates a structure of a system for implementing a document rollback operation at the XDM server 300, wherein the rollback control module 101 is located in the XDM server 300, and finishes a rollback operation on an XML document stored in the XDM server 300 according to the change-recording document stored in the XDM server 300. An implementation flow is as illustrated in FIG. 6.

1. The XDM client 100 transmits to the XDM server 300 an XCAP request. The message body of the XCAP request includes information on an XML document to be rolled back, a rollback-to version, etc. which may be represented with the following XML structure:

```
<?xml version="1.0" encoding="UTF-8"?>
<xs:schema targetNamespace="urn:oma:params:xml:ns:xcap-rollback"
    xmlns:xs="http://www.w3.org/2001/XMLSchema"
    xmlns="urn:ietf:params:xml:ns:xcap-log"
    elementFormDefault="qualified" attributeFormDefault="unqualified">
  <xs:element name="roll-back">
    <xs:complexType>
      <xs:element name="document" type="xs:anyURI"/>
      <xs:complexType>
        <xs:choice>
          <xs:element name="previous-etag" type="xs:string"/>
          <xs:element name="back-steps" type="xs:integer"/>
          <xs:element name="before" type="xs:datetime"/>
        </xs:choice>
      </xs:complexType>
    </xs:complexType>
  </xs:element>
</xs:schema>
```

Particularly, <roll-back> is a root element, and includes a sub-element <document> indicating a document to be rolled back, and further includes any one of elements <previous-etag>, <back-steps> and <before> indicating a rollback-to version.

For example, it is assumed that the XDM client 100 will roll an XML document back to a state with an etag "cdcdcdcd", and the Uniform Resource Identifier (URI) of this document is as follows:

http://xcap.example.com/services/resource-lists/users/sip:userA@example.com/friends.xml The XDM client 100 may transmit the following XCAP request message to the XDM server 300:

```
PUT http://xcap.example.com/services/resource-lists/userA@
example.com/rollback HTTP/1.1
...
Content-Type: application/rollback+xml
Content-Length: (...)
<?xml version="1.0" encoding="UTF-8"?>
<rollback xmlns="urn:oma:params:xml:ns:rollback">
  <document>resource-lists/users/sip:userA@
  example.com/friends.xml</document>
    <back-etag>cdcdcdcd</back-etag>
</rollback>
```

2. The aggregation proxy server 200 forwards the XCAP request message to a corresponding XDM server 300 in accordance with Application Unique ID (AUID) in the XCAP request message.

3. The XDM server 300 extracts information from the message, and retrieves the XML document to be rolled back and the rollback-to version. The rollback control module 101 performs a rollback operation on the XML document. A specific implementation is as described above, and will not be repeated herein.

4. The XDM server 300 returns a response.

5. The aggregation proxy server 200 transmits the response to the XDM client 100.

In the above process 1, the XDM client may alternatively transmit a rollback request through an HTTP POST message.

Particularly, Request-URI in the POST message is an operation object document: http://xcap.example.com/services/resource-lists/userA@example.com/friends.xml The message is particularly as follows:

```
                            POST
http://xcap.example.com/services/resource-lists/userA@
example.com/friends.xml HTTP/1.1
...
Content-Type: application/rollback+xml
Content-Length: (...)
<?xml version="1.0" encoding="UTF-8"?>
<rollback xmlns="urn:oma:params:xml:ns:rollback">
  <document>resource-lists/users/sip:userA@
  example.com/friends.xml</document>
  <back-etag>cdcdcdcd</back-etag>
</rollback>
```

Figure 7:
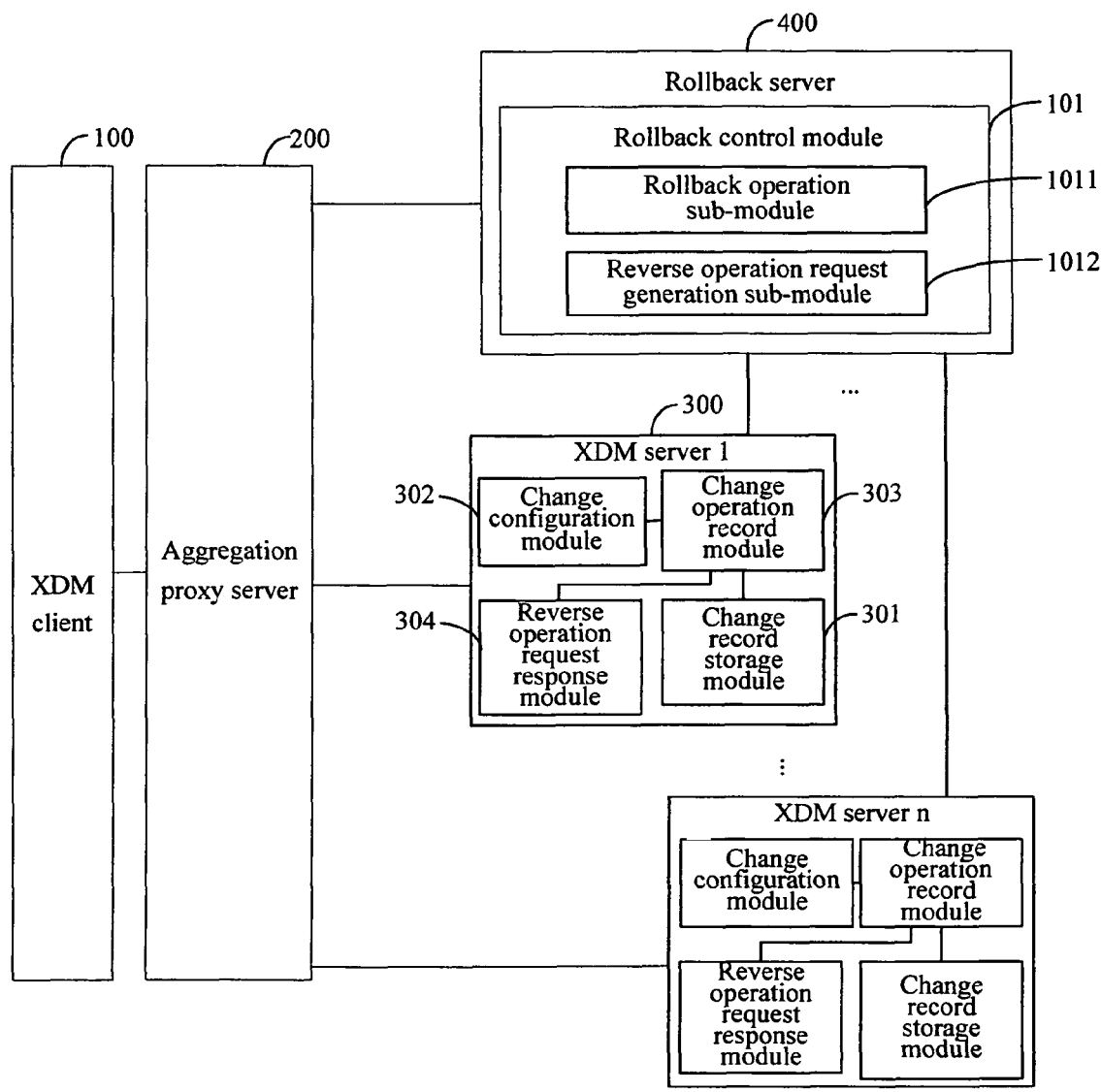
FIG. 7 is a structural diagram of a system for implementing a document rollback operation with a rollback server added in an XDM system in a second embodiment of the invention.

FIG. 7 illustrates a structural diagram of a system for implementing a document rollback operation with a rollback server 400 added in an XDM system. The rollback control module 101 is located in the rollback server 400. The rollback server 400 determines which state an XML document in the XDM server 300 is rolled back to in accordance with rollback information in a rollback request from the XDM client 100. Also, the system may define AUID as "org.openmobilealliance.rollback" indicating a rollback application.

It is assumed that an XML document to be rolled back for the client is as follows:

```
http://xcap.example.com/services/resource-lists/users/sip:userA@
example.com/ friends.xml
```

If the etag of the rollback-to version is "cdcdcdcd", the XDM client 100 transmits to the rollback server 400 such a request with a message body including information on the URI of the XML document to be rolled back, the rollback-to version, etc. The message body is in a format similar to that as described above:

```
                            PUT
http://xcap.example.com/services/org.openmobilealliance.rollback/users/
sip:userA@example.com/ HTTP/1.1
...
Content-Type: application/rollback+xml
Content-Length: (...)
<?xml version="1.0" encoding="UTF-8"?>
<rollback xmlns="urn:oma:params:xml:ns:rollback">
<document>http://xcap.example.com/services/resource-lists/users/sip:
userA@example.com/friends
.xml</document>
  <back-etag>cdcdcdcd<back-etag>
</rollback>
```

Figure 8:
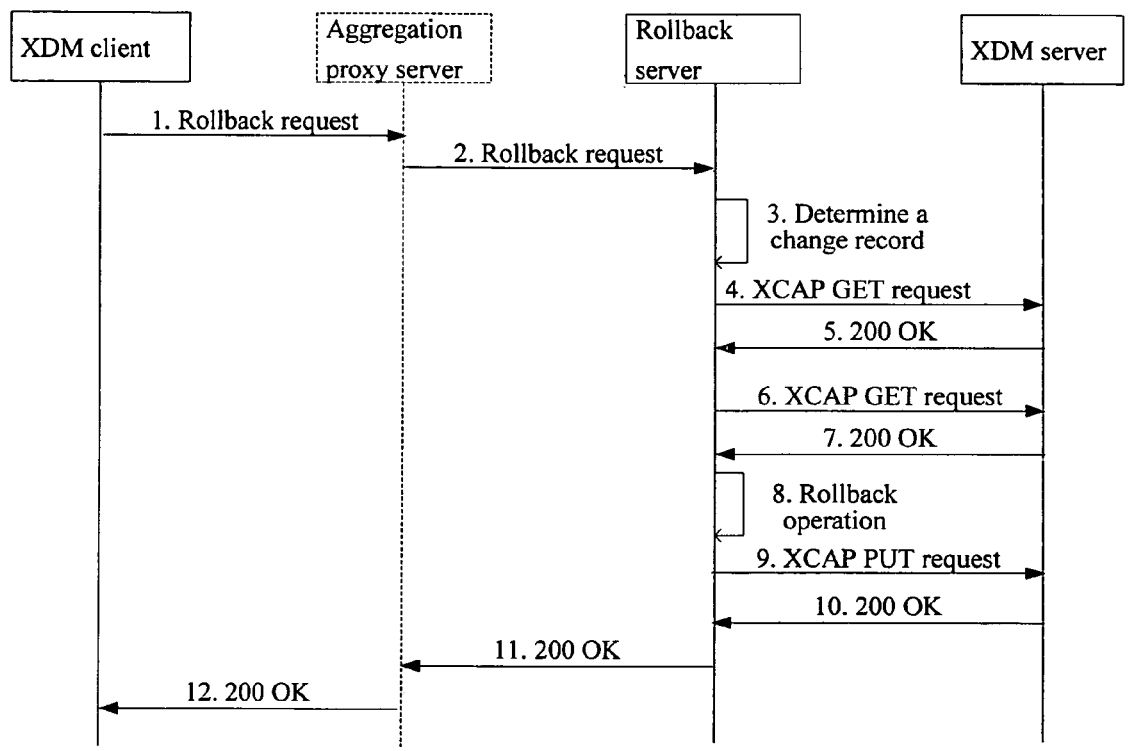
FIG. 8 is a flow diagram of implementing a document rollback operation with a rollback server added in an XDM system in the second embodiment of the invention.

An implementation flow is as illustrated in FIG. 8, and is detailed below.

1. The XDM client 100 transmits the above XCAP request to the aggregation proxy server 200.

2. The aggregation proxy server 200 forwards the XCAP request message to the rollback server 400 in accordance with the AUID in the head of the XCAP request message.

3. Upon receiving the XCAP request message, the rollback server 400 determines whether a change record for the XML document exists in accordance with a document change record in the change configuration module 302.

4. The rollback server 400 transmits to a corresponding XDM server 300 an XACP GET message requesting for a corresponding XML document.

5. The XDM server 300 returns the XML document requested to the rollback server 400.

6. The rollback server 400 transmits to the XDM server 300 an XCAP GET message requesting for retrieval of a corresponding change-recording XML document.

7. The XDM server 300 returns the change-recording XML document requested to the rollback server 400.

8. The rollback server 400 performs a rollback operation on the XML document.

9. The rollback server 400 transmits the rolled back XML document to the XDM server 300.

10. The XDM server 300 stores the rolled back document and returns a response message to the rollback server 400.

11. The rollback server 400 returns a response message to the aggregation proxy server 200.

12. The aggregation proxy server 200 returns a response message to the XDM client 100.

In the second embodiment of the invention, starting with a latest operation record, the rollback control module 101 generates a sequence of reverse XCAP operation requests in accordance with the corresponding change-recording document, and in response to each of the reverse XCAP operation requests, the XDM server 300 proceeds sequentially with rolling back a corresponding XML document to obtain the rolled back XML document as required. These reverse operation requests from the rollback control module 101 are generated by the reverse operation request generation module 1012. Correspondingly, a reverse operation request response module 304 is added in the XDM server 300. The reverse operation request response module 304 is adapted to perform a rollback change on a document in accordance with a reverse operation request generated by the reverse operation request generation module 1012. As compared with the first embodiment, the second embodiment can reduce the traffic volume between the XDM server 300 and the XDM client 100, and may be implemented on the XDM client 100 or the rollback server 400. A corresponding system structures are as described above, and description of such a system is not repeated.

Figure 9:
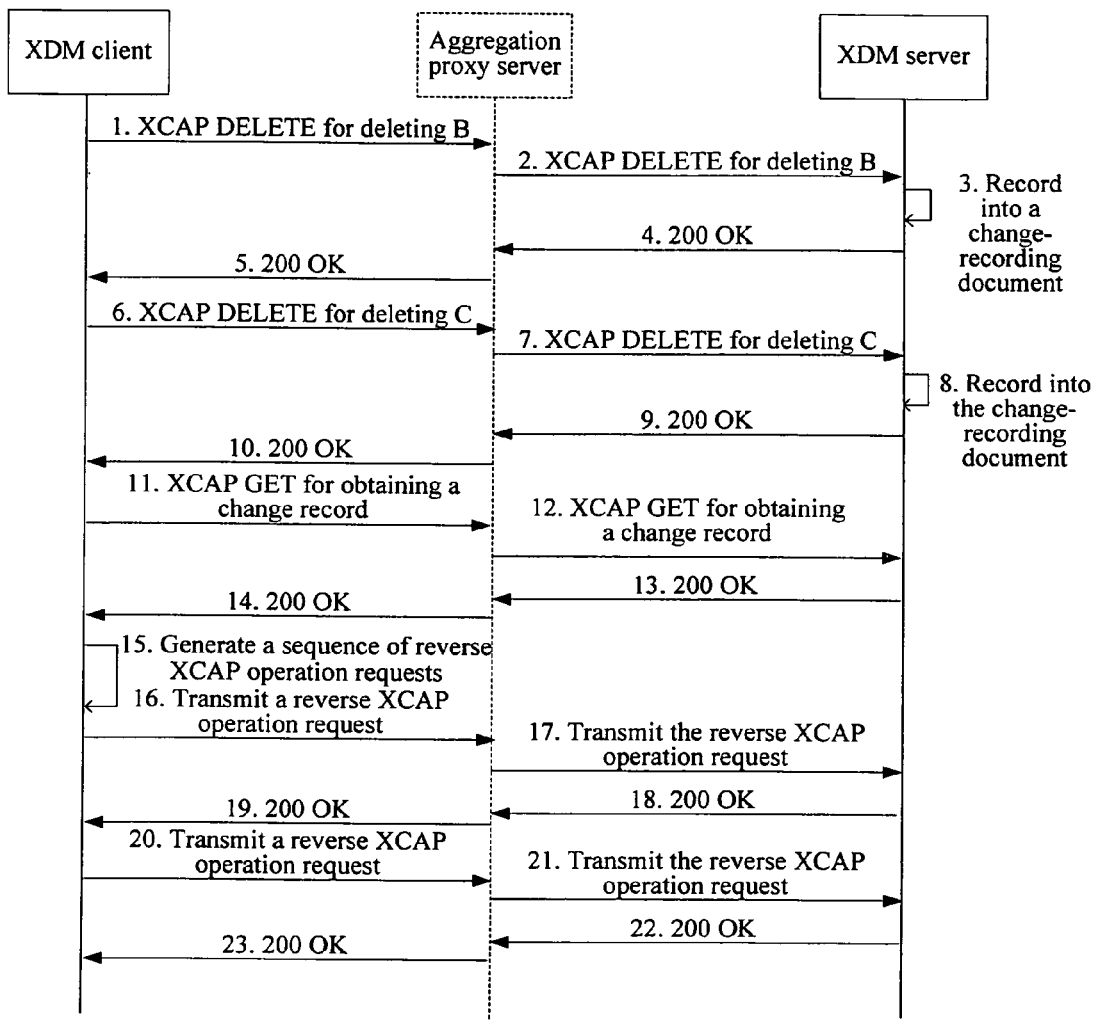
FIG. 9 is a flow diagram of implementing a document rollback operation at an XDM client in the second embodiment of the invention.

FIG. 9 illustrates a flow chart of implementation at the XDM client 100, where the XDM client 100 retrieves a corresponding change-recording document (processes of 11 to 14 in FIG. 9); starting with a latest operation record, the rollback control module 101 generates a sequence of reverse XCAP operation requests (process of 15 in FIG. 9); the XDM client 100 transmits the reverse XCAP operation requests to the XDM server 300; in response to each of the reverse XCAP operation requests, the reverse operation request response module 304 in the XDM server 300 proceeds sequentially with rolling back a corresponding XML document to obtain the rolled back XML document as required (processes of 16 to 23 in FIG. 9). The other processes are identical to those in the above flow, and will not be repeated herein.

Indeed, the rollback server 400 may generate a sequence of reverse XCAP operation requests, and transmits the sequence to the XDM server 300. The XDM server performs the sequence of XCAP operations, and thereby retrieving a rolled back XML document. A specific procedure is as described above, and will not be repeated herein.

In the invention, if the rollback control module 101 is located in the XDM client 100, the rollback control module 101 during a rollback operation may determine whether a latest version of a corresponding XML document is stored in the XDM client 100, and if not, the rollback control module 101 requests the XDM server through an XCAP GET request for the corresponding XML document, otherwise the rollback control module 101 may make use of the document of the latest version stored in the XDM client 100.

It should be noted that only those parts relevant to the invention are illustrated in FIG. 3, FIG. 5 and FIG. 7 of the invention for convenience. Apparently, there are corresponding interface modules arranged in the XDM client 100, the aggregation proxy server 200, the XDM server 300 and the rollback server 400, which are adapted to transport XCAP protocol messages therebetween. In addition to the component modules as described above, the XDM server 300 is further provided with a document storage module for storing an XML document of a user and a document change module for performing a change operation on an XML document of a user. The functions of the above modules can be provided by the existing system. Indeed, the function of the reverse operation request response module 304 as described above in the invention can be enabled with the original document change function of the XDM server 300.

The above are merely preferred embodiments of the invention but not limit the invention. Any modification, equivalent substitution and variation made without departing from the spirit and principle of the invention shall fall within the protective scope of the invention.

The invention claimed is:

1. An extensible markup language (XML) document management method, comprising:
   storing a change record for an XML document when an XML configuration access protocol (XCAP) request for a change operation on an operation object in the XML document is received, wherein:
   the change record comprises a put-event element when the XCAP request is an XCAP PUT request or a delete-event element when the XCAP request is an XCAP DELETE request, the put-event element and the delete-event element being indicative of a record of changing the XML document,
   each one of the put-event element and the delete-event element comprises an attribute node-selector specifying an element of the XML document corresponding to the change operation, a type sub-element indicating an operation type, a previous-etag sub-element indicating an etag value of the XML document prior to the change operation, an etag sub-element indicating an etag value of the XML document after the change operation, and a timestamp sub-element indicating a time stamp at a time of the change operation,
   each one of the put-event element and the delete-event element further comprises:
      a previous-element sub-element recording information on the element of the XML document prior to the change operation if the operation object is the element of the XML document, and
      a previous-attribute sub-element recording information on an attribute of the element of the XML document prior to the change operation if the operation object is the attribute of the element of the XML document, and
   the put-event element further comprises:
      an element sub-element recording information on the element of the XML document after the change operation if the operation object is the element of the XML document, and
      an attribute sub-element recording information on the attribute of the element of the XML document after the change operation if the operation object is the attribute of the element of the XML document;
   receiving, from a user, a document recovery request for recovering an XML document, wherein the document recovery request comprises information on the XML document to be rolled back and a rollback-to version indicated by the previous-etag sub-element;
   searching for a change record corresponding to the rollback-to version of the XML document to be rolled back; and
   performing the following roll back process until the rollback-to version of the XML document is recovered:
      retrieving a lastly changed element according to the timestamp sub-element,
      determining a location of the operation object in the XML document in accordance with the attribute node-selector and determining an operation type in accordance with the type sub-element,
         if the operation type is an XCAP DELETE operation, a recorded element of the XML document in the previous-element sub-element or a recorded attribute value in the previous-attribute sub-element prior to the DELETE operation is inserted at the determined location, and
         if the operation type is an XCAP PUT operation, an element of the XML document or an attribute value at the determined location is replaced with a recorded element of the XML document in the previous-element sub-element or a recorded attribute value in the previous-attribute sub-element prior to the PUT operation.

2. The method according to claim 1, further comprising: controlling the scale of the change records for the XML document.

3. The method according to claim 1, wherein the document recovery request in the recovering operation is transmitted through an XCAP request message or an HTTP POST request message.

4. An extensible markup language (XML) document management system, comprising:
a change operation record module, adapted to store a change operation into a change record for an XML document, when an XML configuration access protocol (XCAP) request for the change operation on an operation object in the XML document is received, wherein:
the change records comprise a put-event element when the XCAP request is an XCAP PUT request or a delete-event element when the XCAP request is an XCAP DELETE request, the put-event element and the delete-event element being indicative of a record of changing the XML document,
each one of the put-event element and the delete-event element comprises an attribute node-selector specifying an element of the XML document corresponding to the change operation, a type sub-element indicating an operation type, a previous-etag sub-element indicating an etag value of the XML document prior to the change operation, an etag sub-element indicating an etag value of the XML document after the change operation, and a timestamp sub-element indicating a time stamp at a time of the change operation,
each one of the put-event element and the delete-event element further comprises:
a previous-element sub-element recording information on the element of the XML document prior to the change operation if the operation object is the element of the XML document, and
a previous-attribute sub-element recording information on an attribute of the element of the XML document prior to the change operation if the operation object is the attribute of the element of the XML document, and
the put-event element further comprises:
an element sub-element recording information on the element of the XML document after the change operation if the operation object is the element of the XML document, and
an attribute sub-element recording information on the attribute of the element of the XML document after the change operation if the operation object is the attribute of the element of the XML document an XML document management (XDM) server, adapted to receive, from a user, a document recovery request for recovering an XML document, wherein the document recovery request comprises information on the XML document to be rolled back and a rollback-to version indicated by the previous-etag sub-element, and the XDM server further comprises
a rollback operation sub-module, adapted to:
search for a change record corresponding to the rollback-to version of the XML document to be rolled back,
retrieve a lastly changed element according to the timestamp sub-element,
determine a location of the operation object in the XML document in accordance with the attribute node-selector and determine operation type in accordance with the type sub-element
if the operation type is an XCAP DELETE operation, the rollback operation sub-module is further adapted to insert, at the determined location, a recorded element of the XML document in a previous-element sub-element or a recorded attribute value in the previous-attribute sub-element prior to the DELETE operation, and
if the operation type is an XCAP PUT operation, the rollback operation sub-module is further adapted to replace an element of the XML document or an attribute at the determined location with a recorded element of the XML document in the previous-element sub-element or a recorded attribute value in the previous-attribute sub-element prior to the PUT operation.

5. The system according to claim 4, further comprising:
a change-recording storage module, adapted to store the change records for the XML document.

6. The system according to claim 5, further comprising:
a change configuration module, adapted to determine whether to store a change record for the user and to control the change operation module to store the change operation into the change-records for the XML document.

7. The system according to claim 6, wherein the change configuration module is further adapted to limit the scale of the change record.

* * * * *